Figure 1:
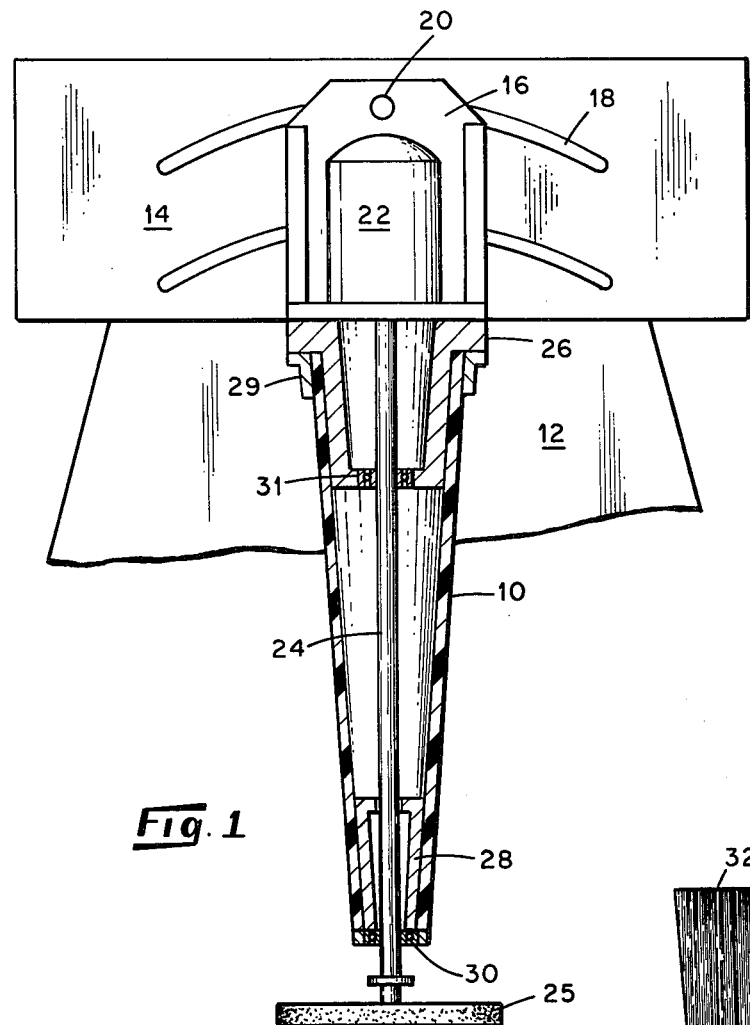

United States Patent [19]

Knight, Jr. et al.

[11] 4,072,084

[45] Feb. 7, 1978

[54] GRAPHITE FIBER REINFORCED STRUCTURE FOR SUPPORTING MACHINE TOOLS

[75] Inventors: Charles E. Knight, Jr., Knoxville; Louis Kovach, Oak Ridge; John S. Hurst, Knoxville, all of Tenn.

[73] Assignee: The United States of America as represented by the United States Department of Energy, Washington, D.C.

[21] Appl. No.: 751,622

[22] Filed: Dec. 17, 1976

[51] Int. Cl.² .................. B23B 47/00; B23C 5/28; B24B 45/00
[52] U.S. Cl. .................. 90/11 A; 51/134.5 R; 51/166 MH; 408/143; 408/238
[58] Field of Search .................. 90/11 A, 11 R; 51/166 MH, 166 R, 134.5 R; 408/143, 238, 239, 241 R

[56] References Cited

U.S. PATENT DOCUMENTS

| 2,879,069 | 3/1959 | Swanson | 408/238 X |
| 3,968,728 | 7/1976 | Goldfarb et al. | 40/11 R X |

*Primary Examiner*—Willie G. Abercrombie
*Assistant Examiner*—Z. R. Bilinsky
*Attorney, Agent, or Firm*—Dean E. Carlson; Stephen D. Hamel; Earl L. Larcher

[57] ABSTRACT

Machine tools utilized in precision machine operations require tool support structures which exhibit minimal deflection, thermal expansion and vibration characteristics. The tool support structure of the present invention is a graphite fiber reinforced composite in which layers of the graphite fibers or yarn are disposed in a 0/90° pattern and bonded together with an epoxy resin. The finished composite possesses a low coefficient of thermal expansion and a substantially greater elastic modulus, stiffness-to-weight ratio, and damping factor than a conventional steel tool support utilized in similar machining operations.

6 Claims, 2 Drawing Figures

GRAPHITE FIBER REINFORCED STRUCTURE FOR SUPPORTING MACHINE TOOLS

The present invention relates generally to machine tool support structures and, more particularly, to a graphite fiber reinforced composite which provides a tool support which is characterized by possessing substantially less vibration and chatter than previously known tool supports. This invention was made in the course of, or under, a contract with the U.S. Energy Research and Development Administration.

Precision machining requires the use of machine tool components which introduce minimal error in the finished product. In order to maintain the machine within desired operating parameters the components utilized for fabricating the machine should exhibit minimal deflection, thermal expansion, and vibration characteristics during the operation of the machine tool, so as to reduce a substantial source of dimensional errors in the finished product. In many machining operations dimensional inaccuracies and surface defects in the workpiece are usually produced by the weaknesses in the machine components rather than in the machine program, such that any improvement in the structural properties of the machine components would necessarily result in an improvement in the dimensional accuracy and finish of the machined product.

Accordingly, it is the primary aim or goal of the present invention to provide a structure for supporting a machine tool which is particularly characterized by a high flexural stiffness for minimizing machining errors due to loadings applied against the machine tool during operation thereof and also which has a high damping capacity for lessening the effects of tool vibration on the surface of the workpiece. Another desired property provided by the present invention is that the tool support has a relatively low coefficient of thermal expansion so as to minimize inaccuracies caused by temperature variations in the environment and the tool support during the operation of the machine. The goal of the present invention is achieved by employing a novel tool support in combination with a machine tool which has a machine tool housing with the tool support being carried by the housing for supporting a tool in a desired working relationship with a workpiece. The tool support comprises a hollow elongated tubular body formed of a plurality of layers of graphite fibers or yarn with the layers and the yarn in each layer bounded together with a resin binder. The fibers in the majority of the layers are disposed in a side-by-side relationship and so oriented as to extend along a plane projecting between opposite ends of the tubular body. The fibers in the minority of the layers are wound about the tubular body in a side-by-side relationship and project in a plane orthogonal to the fibers in the first-mentioned plane. Each of the layers of graphite fibers forming the minority layers are separated from one another by a plurality of the majority layers.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. For example, while the tool support structure of the present invention is shown as a support for a precision contour grinder, it is to be understood that the tool support of the present invention may be used in many other machine tool supporting operations, such as associated with boring bars, routers, and vertical milling operations.

Figure 2:
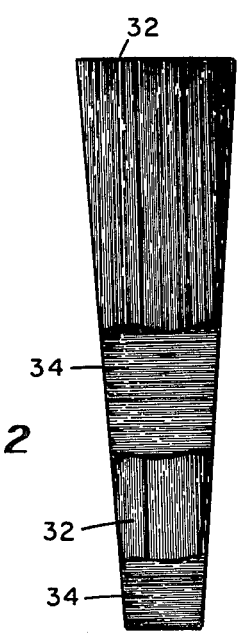

In the accompanying drawing:

FIG. 1 is an elevational schematic view showing, in section, the graphite fiber tool support structure of the present invention coupled to a contour grinding apparatus; and FIG. 2 is a schematic view of the tool support, partially broken away, for showing details of the graphite fiber layers.

Described generally, the present invention is directed to a machine tool in which the tool employed for precision work upon a workpiece is supported by the machine tool by a graphite fiber-resin binder composite. This tool support forms the basis of the present invention and comprises an elongated tubular body formed of graphite fiber or yarn within a resin binder system in which the majority of the fibers are oriented in the longitudinal direction so as to provide a high flexural stiffness, a high damping capacity, and a low coefficient of thermal expansion. The tool support structure of the present invention is characterized by an elastic modulus between steel and tungsten carbide while possessing a stiffness-to-weight ratio of approximately seven times better than steel and approximately four times better than tungsten carbide at only one-tenth of the weight of the latter. Also, the tool support has a damping factor, relative to steel, of approximately twenty times better than a conventional steel tool support employed for the same purpose.

The pattern of the fibrous graphite yarn utilized in the fabrication of the tool support structure is a 0° and 90° pattern wherein the longitudinally oriented layers, that is, the layers extending along the 0° plane projecting between opposite ends of the support, are provided by manually applied gores of parallel fibers with these gores being cut to size and shape from a unidirectionally wound "fiber blanket." The layers of yarn in the 90° pattern are formed in situ on the composite by circumferentially winding the yarn in a side-by-side relationship upon a mandrel utilized in the fabrication of the tool support structures. The yarn and resin binder are subjected to several compactions in a matched die assembly during fabrication to provide a relatively dense, high-fiber content structure.

Described more specifically and with reference to the accompanying drawing, the graphite-fiber tool support 10 of the present invention is shown afixed to a contour grinder 12 comprising a frame 14 to which a spindle bracket 16 is attached thereto, slots 18 are provided in the frame 14 for pivoting the grinding head during various contour grinding operations. Pins 20 extend through the spindle bracket 16 and are utilized for effecting the pivotal movement of the tool support 10 in the frame 14. A drive motor 22 is shown carried by the spindle bracket 16 and is coupled to a drive shaft 24 which projects through the tool support 10 to a grinding wheel 25. Within the tool support 10 there are metal adapters 26 and 28 for respectively securing the tool support 10 to the spindle 16 by bolts or the like (not shown) and for rotatably supporting the drive shaft within the tool support 10. These adapters which are tubular and cone-shaped to conform with the inner wall surface of the support 10 are placed against and bonded to these inner wall surfaces by any suitable epoxy adhesive. A metal sleeve 29 is shown disposed about the upper end of the tool support 10 for providing an additional coupling of the tool support 10 to the adapter 26. The adapters 26 and 28 are provided with suitable bearings 30 and 31 for rotatably supporting the drive shaft 24.

The fabrication of the tool support 10 is provided by employing a 0/90° fiber pattern with five to twenty longitudinally oriented layers of fibers for each circumferentially disposed fiber layer. The graphite fibers as described herein are in the form of a yarn with about 1440 graphite monafilaments. The number of layers of the yarn or fibers required for fabrication of the tool support depends upon the particular application, normally a thickness of about one inch provides the rigidity necessary for surpassing that provided by a similar steel structure. With an average thickness of each fiber layer being about 6 mils, the total number of layers desired in the tool support may be easily calculated.

As best shown in FIG. 2, the tool support 10 is of a generally tubular hollow conical configuration. This conical configuration is of an angle of 3° to 4° with respect to the longitudinal axis and provides the best flexural stiffness due to increasing section moment of inertia in approaching the mount end.

In forming the tool support 10, a right angled cylindrical mandrel, not shown, having a circumference at least as great as the length of the tool support 10 is wound with graphite fibers in a side-by-side relationship. These fibers are preferably passed through a bath of a suitable epoxy resin binder prior to winding the fibers about the mandrel. When the winding is completed, the winding is removed from the mandrel and laid out as a single solid sheet or blanket. From this sheet gores of a generally triangular configuration are cut by using a suitable triangular template. The number of gores 32 utilized for the construction of the tubular support is not critical in that, for example, three triangularly-shaped gores provide adequate coverage of the tool support surface. The cutting of the gores from the blanket is such that the orientation of the graphite fibers in the gores when applied to the tool support 10 is parallel to the longitudinal axis of the tool support, that is, the fibers project along a plane extending between opposite ends of the tool support 10.

To apply the gores 32 during the buildup of the tool support 10, a mandrel having a generally conical configuration is first provided with a release agent of any suitable type, e.g., polytetrafluoroethylene spray coating or mold release wax on the surface, then covered by a polyester film, and then the gores are placed in position thereon and held in place by the tackiness of the gore surface. As successive layers of the gores 32 are placed upon the mandrel, their joints are offset from those of the preceding layer of gores to assure that the seams are staggered about the circumference of the tool support. After a desired number of layers, e.g., about five to twenty layers, of the gores 30 have been placed on the mandrel, the mandrel is placed in a conventional winding machine so that a circumferential layer 34 of a continuous graphite yarn may be applied in situ. This circumferential layer of graphite fibers is provided over the entire length of the tool support with the fibers being disposed in side-by-side relationship along a plane orthogonal to the longitudinal axis of the tool support. The yarn employed for forming the circumferential layer is preferably passed through the resin binder prior to winding it about the mandrel. Satisfactory results have been achieved by orienting approximately 90 percent of the graphite fibers in the longitudinal direction and about 10 percent of the fibers in the circumferential direction. The purpose of positioning the majority of the graphite fibers in the longitudinal direc015 is that the elastic modulus is greater with the majority of fibers so oriented then would be if a lesser quantity of the fibers were longitudinally disposed. The circumferential fiber layers 34 disposed between the layers of longitudinally oriented fibers provide a minimal transverse strength in the composite to avoid any longitudinal cracks because of the weak transverse strength of the graphite fiber composite.

In order to assure that the tool support contains at least about 50 to 60 volume percent fibers, the binder in excess of about 40 to 50 volume percent is driven from the composite prior to the curing of the resin. This removal of the excess binder is achieved by pressing the composite in a suitable die assembly at a pressure in the range of about 400 to 500 psi. The application of the pressure loading is preferably achieved at selected sequences during the fabrication of the composite. For example, compaction of the composite to force the excess resin from the system may be satisfactorily achieved after each four or five layers of fibers are applied to the mandrel.

After applying the selected number of fiber layers, longitudinally and circumferentially, on the fabrication mandrel to form the composite of the desired wall thickness, the resin system is allowed to fully cure so as to secure the fibers and the adjacent layers of fibers tenaciously together. The resin system employed as the binder is preferably an epoxy resin of the type curable at room temperatures so to obviate the use of heat and other curing mechanisms which could possibly detract from the integrity of the structure.

With the completion of the tubular graphite fiber-resin binder composite, it is interfaced with the adapters 26 and 28. This interfacing may be achieved by etching the surface of the metal adapters 26 and 28 and then adhesively bonding them into the tubular composite 10. The epoxy resin employed for binding together the fibers may be used for attaching the adapters to the composite. Interfacing the composite with the adapters 26 and 28 should be achieved with considerable care since misalignment or a poor bond between the mating surfaces will lower the stiffness of the tool support 10 as well as introduce inaccuracies in the performance of the grinding head.

The stiffness of the tubular support 10 in the contour plane at the grinding wheel is approximately 6.6 microinches per pound of force applied against the grinding head for in-plane horizontal loads. If these grinding forces are less than 25 pounds, the total contour errors due to the deflection of the tool support 10 is only about 160 microinches. In a demonstration of the invention, a graphite cylinder was ground to a diameter of 27 inches and a height of 12 inches with the variation of the cylinder diameter being with ± 0.0003 inch.

The elastic modulus of the tool support 10 with 52 volume percent fibers, an overall length of approximately 48 inches with a diameter of about 11 inches at the large end and about 5½ inches at the small end is about $40 \times 10^6$ psi which is substantially greater than a steel tool support of a similar configuration which has an elastic modulus of $30 \times 10^6$ psi. The density in grams per cubic centimeter of the tool support composite is 1.5 which compares favorably to that of a steel tool support which is 7.8 grams per cubic centimeter so as to provide a stiffness-to-weight ratio 7 times greater than that of the steel support. The coefficient of thermal expansion of the graphite-resin composite is essentially zero whereas a steel tool support is about $8.5 \times 10^{-6}$/inch/1° F. The damping factor which eliminates a substantial amount of the detrimental chatter and vibration found in tool supports of the nature described is such that the graphite fiber-resin composite has a damping factor of about 20 times greater than that provided by a steel support when relatively compared which provides a significant improvement in the rigidity of tool supports. In fact, it is believed that any additional improvements in the rigidity of the grinder of the type described herein would have to be achieved in other components since the elastic modulus of the tool support is significantly greater than that of other components of the grinding machine.

It will be seen that the present invention provides a unique tool support structure which is characterized by a high flexural stiffness for minimizing errors resulting from machining forces, a high damping capacity for minimizing the effect of vibration on the surface finish, near zero coefficient of thermal expansion for reducing inaccuracies caused by temperature variations in the environment and other machine components, and a light weight for decreasing machine tool deflections caused by the machine component weight.

What is claimed is:

1. In combination with a machine tool comprising a machine tool housing and a tool support carried by said housing for supporting a tool in a desired working relationship with a workpiece, said tool support comprising a hollow elongated tubular body formed of a plurality of layers of graphite fibers with the layers and fibers in each layer bonded together with a resin binder, the fibers in the majority of said layers being disposed in a side-by-side relationship and oriented so as to extend along a plane projecting between opposite ends of the tubular body, the fibers in the minority layers being wound about the tubular body in a side-by-side relationship and projecting in a plane orthogonal to the fibers in the first-mentioned plane, each of the minority of the layers being separated from one another by a plurality of the majority of the layers.

2. The combination claimed in claim 1, wherein about 90 percent of the total volume of the graphite fibers are disposed along said first-mentioned plane.

3. The combination claimed in claim 1, wherein the graphite fibers in the second-mentioned plane are circumferentially wound in situ, and wherein each of the fiber layers in said first-mentioned plane are provided by a plurality of gores disposed in a side-by-side relationship, and wherein the seams of the gores are offset from one another in succeeding fiber layers.

4. The combination claimed in claim 3, wherein five to twenty fiber layers in said first-mentioned plane are disposed between each fiber layer in said second-mentioned plane.

5. The combination claimed in claim 4, wherein the tool support is of conical configuration, and wherein steel adapters are bonded to the inner surface of said tool support adjacent to said opposite ends for attaching said tool support to said housing at the larger diameter end of said tool support and for carrying a tool at the smaller end of said tool support.

6. The combination claimed in claim 4 wherein a rotatable shaft extends through said tool support, and wherein bearing means are disposed in said steel adapters at the ends of the tool support for rotatably carrying said shaft.

* * * * *